(12) United States Patent
Matney et al.

(10) Patent No.: US 10,816,487 B2
(45) Date of Patent: Oct. 27, 2020

(54) IMAGE CONTRAST IN X-RAY TOPOGRAPHY IMAGING FOR DEFECT INSPECTION

(71) Applicant: BRUKER JV ISRAEL LTD., Migdal HaEmek (IL)

(72) Inventors: Kevin Monroe Matney, Centennial, CO (US); Oliver Whear, Durham (GB); Richard Thake Bytheway, Durham, NC (US); John Leonard Wall, Durham (GB); Matthew Wormington, Littleton, CO (US)

(73) Assignee: BRUKER TECHNOLOGIES LTD., Migdal HaEmek (IL)

(*) Notice: Subject to any disclaimer, the term of this patent is extended or adjusted under 35 U.S.C. 154(b) by 0 days.

(21) Appl. No.: 16/266,125

(22) Filed: Feb. 4, 2019

(65) Prior Publication Data

US 2019/0317028 A1    Oct. 17, 2019

Related U.S. Application Data

(60) Provisional application No. 62/656,372, filed on Apr. 12, 2018.

(51) Int. Cl.
*G01N 23/205* (2018.01)
*G01N 23/207* (2018.01)

(52) U.S. Cl.
CPC ......... *G01N 23/205* (2013.01); *G01N 23/207* (2013.01); *G01N 2223/33* (2013.01)

(58) Field of Classification Search
None
See application file for complete search history.

(56) References Cited

U.S. PATENT DOCUMENTS

| | | | |
|---|---|---|---|
| 4,794,648 A | 12/1988 | Ayata et al. | |
| 4,989,226 A | 1/1991 | Woodbury et al. | |
| 5,481,109 A | 1/1996 | Ninomiya et al. | |
| 5,619,548 A | 4/1997 | Koppel | |
| 5,740,226 A | 4/1998 | Komiya et al. | |

(Continued)

OTHER PUBLICATIONS

Incoatec GmbH., "Montel Optics—'2D Multilayer Mirrors for X-ray Diffractometry", pp. 1-2, year 2015.

(Continued)

*Primary Examiner* — Hoon K Song
(74) *Attorney, Agent, or Firm* — Kligler & Associates Patent Attorneys Ltd

(57) ABSTRACT

A system for X-ray topography, the system includes a source assembly, a detector assembly, a filter and a processor. The source assembly is configured to direct at least an X-ray beam to impinge, at an angle, on a first surface of a sample, the X-ray beam is divergent when impinging on the first surface. The detector assembly is configured to detect the X-ray beam that had entered the sample at the first surface, diffracted while passing through the sample and exited the sample at a second surface that is opposite to the first surface, and to produce an electrical signal in response to the detected X-ray beam. The filter is mounted between the source assembly and the first surface, and is configured to attenuate an intensity of a selected spectral portion of the X-ray beam. The processor is configured to detect one or more defects in the sample based on the electrical signal.

18 Claims, 5 Drawing Sheets

(56) References Cited

U.S. PATENT DOCUMENTS

| | | | |
|---|---|---|---|
| 5,900,645 | A | 5/1999 | Yamada |
| 6,041,098 | A | 3/2000 | Touryanski et al. |
| 6,163,592 | A | 12/2000 | He et al. |
| 6,226,349 | B1 | 5/2001 | Schuster et al. |
| 6,242,745 | B1 | 6/2001 | Berlad et al. |
| 6,271,534 | B1 | 8/2001 | Kumakhov |
| 6,381,303 | B1 | 4/2002 | Vu et al. |
| 6,389,102 | B2 | 5/2002 | Mazor et al. |
| 6,512,814 | B2 | 1/2003 | Yokhin et al. |
| 6,556,652 | B1 | 4/2003 | Mazor et al. |
| 6,639,968 | B2 | 10/2003 | Yokhin et al. |
| 6,680,996 | B2 | 1/2004 | Yokhin et al. |
| 6,750,952 | B2 | 6/2004 | Grodnensky et al. |
| 6,754,304 | B1 | 6/2004 | Kumakhuv |
| 6,754,305 | B1 | 6/2004 | Rosencwaig et al. |
| 6,782,076 | B2 | 8/2004 | Bowen et al. |
| 6,810,105 | B2 | 10/2004 | Nasser-Ghodsi et al. |
| 6,859,520 | B2 | 2/2005 | He et al. |
| 6,879,051 | B1 | 4/2005 | Singh et al. |
| 6,895,075 | B2 | 5/2005 | Yokhin et al. |
| 7,076,024 | B2 | 7/2006 | Yokhin |
| 7,110,491 | B2 | 9/2006 | Mazor et al. |
| 7,113,566 | B1 | 9/2006 | Peled et al. |
| 7,120,228 | B2 | 10/2006 | Yokhin et al. |
| 7,242,745 | B2 | 7/2007 | He et al. |
| 7,481,579 | B2 | 1/2009 | Yokhin et al. |
| 7,483,513 | B2 | 1/2009 | Mazor et al. |
| 7,551,719 | B2 | 6/2009 | Yokhin et al. |
| 7,600,916 | B2 | 10/2009 | Yokhin et al. |
| 8,243,878 | B2 | 8/2012 | Yokhin et al. |
| 8,437,450 | B2 | 5/2013 | Wall et al. |
| 8,687,766 | B2 | 4/2014 | Wormington et al. |
| 9,335,282 | B2 | 5/2016 | Omote et al. |
| 9,606,073 | B2 * | 3/2017 | Mazor .............. G01N 23/201 |
| 2001/0043668 | A1 | 11/2001 | Hayashi et al. |
| 2003/0128809 | A1 | 7/2003 | Umezawa et al. |
| 2004/0156474 | A1 | 8/2004 | Yokhin et al. |
| 2009/0095913 | A1 | 4/2009 | Yu et al. |
| 2011/0210250 | A1 | 9/2011 | Nakayama et al. |
| 2011/0268251 | A1 * | 11/2011 | He .................... G01N 23/207 378/71 |
| 2014/0019097 | A1 | 1/2014 | Bakeman et al. |
| 2014/0151569 | A1 | 6/2014 | Schnablegger et al. |
| 2015/0369759 | A1 | 12/2015 | Mazor et al. |
| 2017/0199136 | A1 | 7/2017 | Krokhmal et al. |
| 2017/0307548 | A1 | 10/2017 | Bykanov et al. |
| 2018/0106735 | A1 | 4/2018 | Gellineau et al. |

OTHER PUBLICATIONS

Incoatec, "The Iμs-Story—10 Years Incoatec Microfocus Source", pp. 1-4, year 2016.

Excillum., MetalJet X-Ray Sources, pp. 1-2, year 2018.

Bruker AXS GmbH, "X-Ray source—Microstar", pp. 1-2, Mar. 2018.

Piezomotor., "Linear Motors", pp. 1-5, year 2017.

Lyncean Technologies, Inc, "The Compact X-Ray Station (CXS)", pp. 1-5, year 2017.

Bowen et al., "High resolution x-ray diffractometry and topography", pp. 1-278, Taylor & Francis Publication, year 1998.

Jones et al., "Small angle x-ray scattering for sub-100 nm pattern characterization", Applied Physics Letters, vol. 83, No. 19, pp. 4059-4061, Nov. 10, 2003.

Jones et al., "3-Dimensional Lineshape Metrology Using Small Angle X-ray Scattering", AIP Conference Proceedings, vol. 683, Issue 1, 4 pages, Sep. 2003.

Wormington et al., "Characterization of structures from X-ray scattering data using genetic algorithms", The Royal Society, Philosophical Transactions: Mathematical, Physical and Engineering Sciences, vol. 357, No. 1761, X-Ray Topography and Crystal Characterization, pp. 2827-2848, Oct. 15, 1999.

Axo Dresden GmbH, "Applied X-ray Optics and High Precision Deposition", Technical Data Sheet, 23 pages, May 22, 2013.

Dectris Ltd.,—detecting the future, Eiger X, Detector Series, "The Summit of Hybrid Photon Counting", 4 pages, Sep. 9, 2015.

Oxford Instruments., "50kV Microfocus X-ray source", Technical Data Sheet, 2 pages, May 19, 2015.

Xenocs., "X-ray earn delivery system", Technical Data Sheet, 4 pages, Sep. 15, 2009.

Xos., "Polycapillary Optics for Micro X-Ray Fluorescence and X-Ray Diffraction", 4 pages, Jul. 23, 2015.

Jones et al., "Subnanometer wavelength metrology of lithographically prepraed structures: a comparison of neutron and X-ray scattering", Proceedings of the SPIE, vol. 5038, pp. 191-199, 2003.

Wiener et al., "Characterization of Titanium Nitride Layers by Grazing—Emission X-Ray Fluorescence Spectrometry", Applied Surface Science, vol. 125, pp. 129-136, Elsevier Science B.V., year 1999.

Oxford Instruments Inc., X-ray Tube Information, Series 5000, Model XTF5011, "Packaged X-Ray tubes", Technical Data Sheet, 3 pages, Jun. 1998.

Hayashi et al., "Refracted X-Rays Propagating Near the Surface Under Grazing Incidence Condition", Spectrochimica Acta, Part B 54, pp. 227-230, year 1999.

X-Ray Optical Systems, Inc., "Monolithic Polycapillary Lens Information", Albany, USA, 1 page, Dec. 29, 1998.

Di-Fonzo et al., "Non-Destructive Determination of Local Strain with 100-Nanometre Spatial Resolution", Letters to Nature, vol. 403, pp. 638-640, Feb. 10, 2000.

Guerault, "Specular Reflectivity and Off-Specular Scattering: Tools for Roughness Investigation", Institute Voor Kern-en Stralingsfysica, 15 pages, Dec. 15, 2000.

Hu et al., "Small Angle X-Ray Scattering Metrology for Sidewall Angle and Cross Section of Nanometer Scale Line Gratings", Journal of Applied Physics, vol. 96, No. 4, pp. 1983-1987, Aug. 15, 2004.

Wu et al., "Small Angle Neutron Scattering Measurements of Nanoscale Lithographic Features", Polymer Preprints, vol. 42, No. 1, pp. 265-266, year 2001.

Kojima et al., "Structural Characterization of Thin Films by X-Ray Reflectivity", Rigaku Journal, vol. 16, No. 2, pp. 31-41, year 1999.

Wormington et al., U.S. Appl. No. 16/386,375, filed Apr. 17, 2019.

Wormington et al., U.S. Appl. No. 16/386,339, filed Apr. 17, 2019.

Vinshtein et al., U.S. Appl. No. 16/386,359, filed Apr. 17, 2019.

U.S. Appl. No. 15/398,733 office action dated Aug. 13, 2019.

Chadwick et al., "Radiolucent Structural Materials for Medical Applications", MDDI online, pp. 1-14, Jun. 1, 2001 downloaded from https://www.mddionline.com/news/radiolucent-structural-materials-medical-applications.

U.S. Appl. No. 16/386,339 Office Action dated Jun. 25, 2020.

U.S. Appl. No. 16/386,359 Office Action dated Jun. 25, 2020.

U.S. Appl. No. 16/386,375 Office Action dated Jun. 25, 2020.

* cited by examiner

IMAGE CONTRAST IN X-RAY TOPOGRAPHY IMAGING FOR DEFECT INSPECTION

CROSS-REFERENCE TO RELATED APPLICATIONS

This application claims the benefit of U.S. Provisional Patent Application 62/656,372, filed Apr. 12, 2018, whose disclosure is incorporated herein by reference.

FIELD OF THE INVENTION

The present invention relates generally to X-ray analysis, and particularly to methods and systems for improving image contrast in X-ray topography imaging.

BACKGROUND OF THE INVENTION

Substrates of electronic, optoelectronic and power devices, such as silicon wafers, have a crystalline structure that may contain defects. Various methods have been developed for detecting crystalline defects.

For example, U.S. Pat. No. 6,782,076 describes an X-ray topographic system, comprising an X-ray generator producing a beam of X-rays impinging on a limited area of a sample such as a silicon wafer. A solid-state detector is positioned to intercept the diffracted beam after transmission through or reflection from the sample and produces a digital image of the area on which the X-rays impinge. Relative stepping motion between the sample and the X-ray generator produces a series of digital images, which are combined together.

SUMMARY OF THE INVENTION

An embodiment of the present invention that is described herein provides a system for X-ray topography, the system includes a source assembly, a detector assembly, a filter and a processor. The source assembly is configured to direct at least an X-ray beam to impinge, at an angle, on a first surface of a sample, the X-ray beam is divergent when impinging on the first surface. The detector assembly is configured to detect the X-ray beam that had entered the sample at the first surface, diffracted while passing through the sample and exited the sample at a second surface that is opposite to the first surface, and to produce an electrical signal in response to the detected X-ray beam. The filter is mounted between the source assembly and the first surface, and is configured to attenuate an intensity of a selected spectral portion of the X-ray beam. The processor is configured to detect one or more defects in the sample based on the electrical signal.

In some embodiments, the system includes a motion assembly configured to move the source assembly relative to the sample, the processor is configured to control the motion assembly to compensate for shifts in a position at which the X-ray beam irradiates the detector assembly, the shifts caused by variations in an angle of diffraction of the X-ray beam from the sample. In other embodiments, the source assembly includes at least an X-ray tube, which is configured to emit the X-ray beam, and at least the X-ray tube and the filter are mounted on the motion assembly. In yet other embodiments, the source assembly includes first and second X-ray tubes, which are mounted respectively on first and second motion sub-assemblies of the motion assembly.

In an embodiment, the source assembly includes at least first and second X-ray tubes, mounted on the motion assembly. In another embodiment, the X-ray beam includes at least $k\alpha$ emission and $k\beta$ emission, and the filter is configured to change a ratio between intensities of the $k\alpha$ emission and $k\beta$ emission. In yet another embodiment, the system includes a beam stopper, which is configured to attenuate a stray radiation of the X-ray beam.

In some embodiments, the defects include distortions in a crystal lattice of the sample. In other embodiments, the processor is configured, based on the electrical signal, to reduce contrast variation across the sample. In yet other embodiments, the system includes a scanning assembly, which is configured to move the sample relative to the source assembly and the detector assembly along one or more directions of scanning.

In an embodiment, the detector assembly includes one or more detectors. In another embodiment, the processor is configured to detect the one or more defects within a region of interest (ROI) having a width that matches a width of the detected X-ray beam.

There is additionally provided, in accordance with an embodiment of the present invention, a method including directing at least an X-ray beam to impinge, at an angle, on a first surface of a sample, the X-ray beam is divergent when impinging on the first surface. An intensity of a selected spectral portion of the X-ray beam is attenuated. The X-ray beam that had entered the sample at the first surface, diffracted while passing through the sample and exited the sample at a second surface that is opposite to the first surface, is detected, and an electrical signal is produced in response to the detected X-ray beam. One or more defects in the sample is detected based on the electrical signal.

The present invention will be more fully understood from the following detailed description of the embodiments thereof, taken together with the drawings in which:

DETAILED DESCRIPTION OF EMBODIMENTS

Overview

Figure 1:
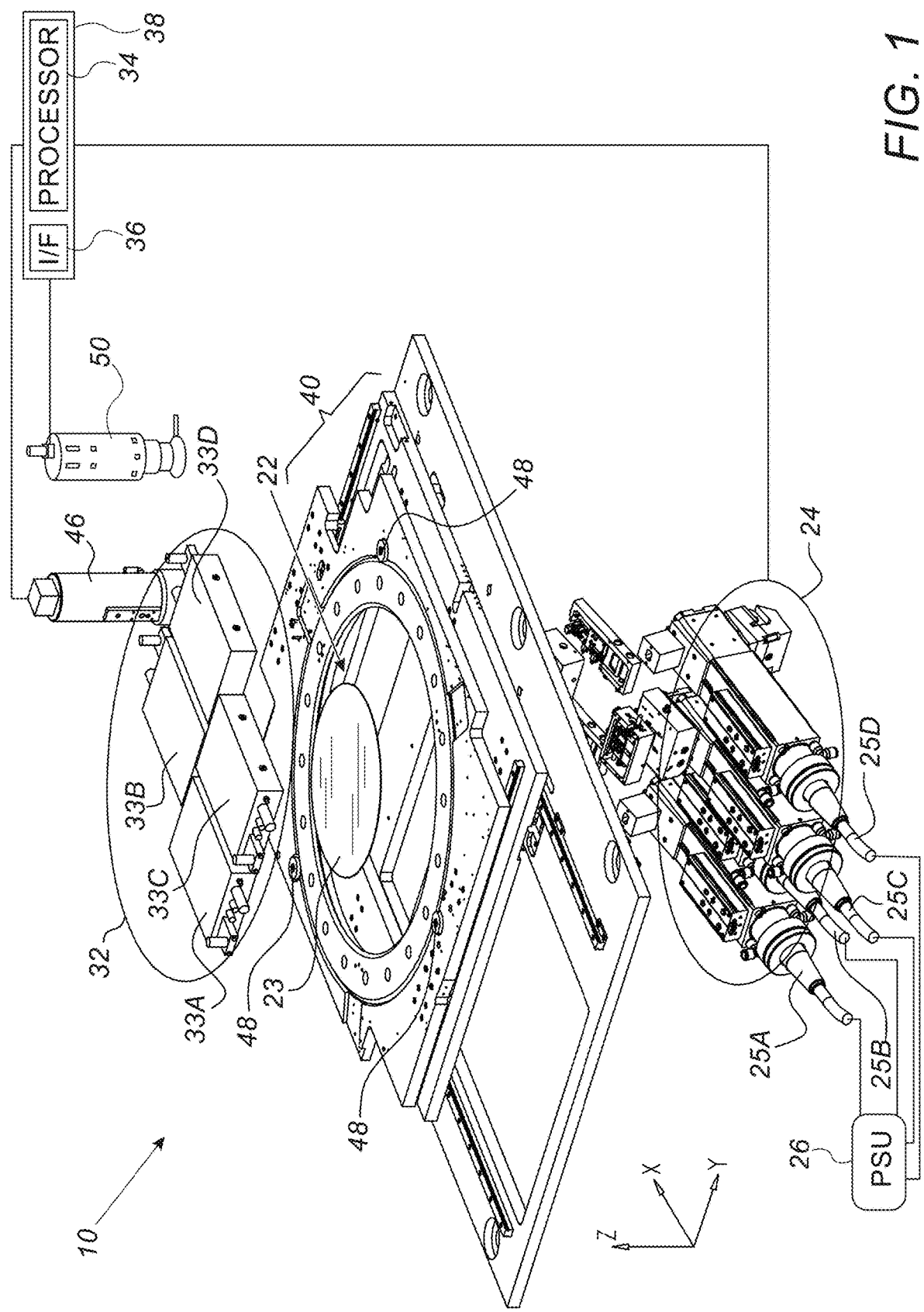
FIG. 1 is a schematic illustration of an X-ray diffraction imaging (XRDI) system, in accordance with an embodiment of the present invention.

X-ray diffraction imaging (XRDI), also known as X-ray topography, may be used for detecting defects in a lattice of a crystalline sample such as a semiconductor wafer, based on analyzing the intensity of the X-rays diffracted from the wafer.

Embodiments of the present invention that are described herein provide methods and systems for improving detection capability of defects in a crystalline sample, by improving the contrast of an image produced using X-ray topography imaging.

In some embodiments, a system for X-ray topography comprises a source assembly that comprises one or more X-ray tubes, which are configured to emit one or more respective X-ray beams. The source assembly is configured to direct the one or more incident X-ray beams to impinge, at an incidence angle, on a given (e.g., lower) surface of a sample, such as a crystalline silicon wafer. In an embodiment, at least one of the incident X-ray beams is divergent (i.e., not collimated) when impinging on the lower surface of the wafer, and has a spectrum comprising at least $k\alpha$ and $k\beta$, emissions.

In some embodiments, the incident X-ray beams are diffracted by crystalline planes while passing through the wafer and exit the wafer at another (e.g., upper) surface opposite to the lower surface.

In some embodiments, the X-ray topography system comprises a detector assembly that comprises one or more detectors, which are configured to detect the one or more respective X-ray beams diffracted from the wafer. In an embodiment, the detector assembly is configured to produce one or more electrical signals in response to detecting the diffracted X-ray beams.

In some embodiments, the system comprises a filter, which is mounted between the source assembly and the lower surface of the wafer. The filter is made from films that attenuate the intensity of the X-ray beams in a selected portion of the full spectrum of the X-ray beams.

In some embodiments, the filter is configured to attenuate the $k\beta$, emission much more than the $k\alpha$ emission, and in this manner significantly modify the intensity ratio between the $k\alpha$ and $k\beta$, emissions.

In some embodiments, the system comprises a processor, which is configured, based on the electrical signals provided by the detector, to produce an image of the wafer, also referred to herein as a wafer map. The processor processes the electrical signals to detect one or more defects in the crystalline wafer, and displays the detected defects on the wafer map.

In some embodiments, the system comprises a source stage, which is configured, based on a control signal from the processor, to change (e.g., adjust) the incidence angle by moving the source assembly relative to the sample. By adjusting the incidence angle, the diffracted X-ray beams fall on a small selected portion of the active area of the detector.

In some embodiments, the processor is configured to improve the contrast of the wafer map by setting a small region of interest (ROI) surrounding the selected portion of the active area, so as to increase the intensity of the detected signal of the diffracted X-ray beams and to reduce or eliminate potential background signals that could be undesirably detected by other portions of the detector.

The disclosed techniques improve the quality and technical performance of electronic, optoelectronic and other technologically important devices having crystalline substrates, by improving the detection sensitivity of defects in a bulk of substrates.

System Description

FIG. 1 is a schematic illustration of an X-ray topographic system 10, in accordance with an embodiment of the present invention. System 10, also referred to herein as an X-ray diffraction imaging (XRDI) system, is configured to inspect a sample in question, such as a semiconductor wafer 22 having a crystalline structure, and to detect defects, such as crystalline defects in the lattice of wafer 22.

In the context of the present disclosure and in the claims, the terms "sample" and "wafer" are used interchangeably and refer to any suitable sample in question. For example, a single crystal silicon wafer (typically oriented to plane (001) denoted Si(001)), large diameter substrates made from a compound semiconductor, for example, those comprising elements of the third and fifth column of the periodic table of elements, also known as III-V substrates, such as gallium-arsenide (GaAs), with lattice mismatched epitaxial layers typically used in opto-electronic devices, gallium-nitride (GaN) and other III-nitride film stacks on Si wafers or silicone-carbide (SiC) substrates for opto-electronic and power-electronic devices, and any other suitable types of substrates.

In some embodiments, the term "crystalline defect" refers to various types of distortions and defects in the lattice of the crystalline wafer. For example, micro-cracks, line defects such as dislocations, planar defects such as stacking faults, and volume defects related to voids, porosity and impurities.

In some embodiments, system 10 comprises a source assembly 24, which is configured to direct one or more X-ray beams (shown in FIG. 3 below) to impinge, at an angle, on a lower surface (not shown) of wafer 22 that is facing source assembly 24. In the example of FIG. 1, source assembly 24 comprises four excitation sources, such as X-ray tubes 25A-25D driven by one or more high-voltage power supply unit (PSU), such as PSU 26. In some embodiments, each of X-ray tubes 25A-25D is configured to direct one or more X-ray beams that are divergent when impinging on the lower surface of wafer 22.

In some embodiments, when the distance between assembly 24 and wafer 22 is less than 1 meter, X-ray tubes 25A-25D are configured to irradiate the entire area of wafer 22 having a diameter of 300 mm. Similarly, source assembly 24 may comprise six X-ray tubes so as to irradiate the entire area of wafer 22 having a diameter of 450 mm.

In some embodiments, each of the aforementioned X-ray tubes may comprise a low-power microfocus source having a spot size smaller than 100 µm at a power smaller than 100 W, or a mid-power normal focus source having a 1 mm spot-size at 2-3 kW, or a high-brightness rotating anode source having a spot-size of about 100 µm at 1-2 kW. In some embodiments, at least one of X-ray tubes 25A-25D may comprise an anode made from a liquid metal, which is configured to emit high energy X-rays.

In some embodiments, each anode of the X-ray tube is typically made from molybdenum (Mo) having a $K\alpha$ energy emission of 17 keV typically operated at 50-60 kV. The Mo-based anode is configured to produce X-rays capable of penetrating wafer 22 or other types of samples.

In other embodiments, the anode of the X-ray tube may comprise any other type of material suitable for different applications. For example, the anode may be made from other materials such as silver (Ag) having a $K\alpha$ energy emission of 22 keV, or indium (In) having a $K\alpha$ energy emission of 25 keV. The Ag-based and In-based anodes may be operated at voltages larger than 50 kV, such high energy X-ray beams are useful for imaging other types of wafers described above.

In some embodiments, at least one X-ray tube of assembly 24 emits X-rays having a suitable energy range and power flux into X-ray optics (not shown). For each of the X-ray tubes, an associated motorized slit (shown in FIG. 3 below) is adjusted so as to shape the X-ray beam from the tube to have a cross-section of a long and narrow rectangle. The slit is depicted in more detail in FIG. 3 below.

In some embodiments, X-ray tubes 25A-25D and the aforementioned slits 110 as well as other optional assemblies are mounted on a motorized rotation stage 42 also referred to herein as a source stage or a motion assembly, having a rotation axis centered at the wafer surface. Stage 42 is controlled by a processing unit 38, which may comprise a general-purpose computer that runs a suitable control software. Additional features of stage 42 are depicted in detail in FIG. 3 below.

In an embodiment, wafer 22 is mounted on a movable platform, such as an X-Y-φ stage 40, which enables moving the sample with respect to the X-ray beams in the X and Y directions, as well as applying azimuthal rotation φ about an axis orthogonal to the surface of wafer 22. Without loss of generality, the terms "X direction" and "X-axis" refer to the scan direction, i.e., the axis along which wafer 22 is scanned. The terms "Y direction" and "Y-axis" refer to the axis on the plane of the wafer that is orthogonal to the scan direction.

In some embodiments, wafer 22 is typically placed using a handling robot (not shown) on stage 40, which comprises three moving tables. For example a lower table for the X axis, a middle plate for the Y axis, and an upper plate for a rotation axis. All three plates have an opening so as to allow the X-ray beam to imping on the lower surface of wafer 22.

In some embodiments, in the configuration of system one of the linear axes (Y) may be reduced in range compared to the main scanning axis (X) or removed completely since the beam height spans a large fraction of the wafer diameter, or possibly the entire wafer or more. Moving stage 40 can be controlled by stepper motors, servo motors, or some combination thereof, which may be controlled, for example, by processing unit 38 running any suitable motion-control software. In some embodiments, wafer 22 may be moved along the X-axis in a series of small, discrete steps (step scanning) or at a constant speed (continuous scanning).

In some embodiments, system 10 comprises a detector assembly 32, which is configured to detect the X-rays entering wafer 22 at the lower surface, diffracted while passing through wafer 22, and exit therefrom at an upper surface 23 that is opposite to the lower surface. Detector assembly 32 is configured to produce an electrical signal in response to the detected X-ray beam diffracted from wafer 22, and to transfer the electrical signal to processing unit 38.

In some embodiments, detector assembly comprises four detectors 33A-33D arranged in a staggered pattern with overlapping regions between the individual detectors so as cover surface 23 wafer without gaps. Each detector of assembly 32 comprises a two-dimensional (2D) position-sensitive X-ray camera configured to measure the X-rays diffracted through wafer 22 according to Laue geometry, as a function of the detector position with respect to the surface of the wafer.

In some embodiments, four X-ray tubes 25A-25D are arranged with an offset in the X direction and are aligned in the Y direction. In some embodiments, the four corresponding detectors 33A-33D are arranged in a similar way, each detector facing its corresponding X-ray tube. In alternative embodiments, the detector assembly may comprise any suitable number of detectors that are able to detect all diffracted X-rays from wafer 22 and to eliminate cross-talk, such as a single detector that comprises virtual regions of interest defined by processor 34, as shown, for example, in FIG. 2 below.

In some embodiments, detector assembly 32 may comprise one or more charge-coupled device (CCD) or complimentary metal-oxide semiconductor (CMOS) cameras featuring X-ray sensitive scintillator screens in the case of step scanning. Additionally or alternatively, detector assembly 32 may comprise hybrid photon counting detectors capable of counting individual photos using Silicone or cadmium telluride (CdTe) sensors such as those commercially offered by Dectris Ltd (Switzerland).

In other embodiments, such as during continuous scanning, one or more time delay and integration (TDI) X-ray cameras, such as those manufactured by Hamamatsu Photonics (Japan), may be used to increase signal-to-noise ratio (SNR) at high scanning speeds.

In some embodiments, system 10 comprises a high-resolution X-ray camera 46, typically comprising an X-ray sensitive CCD or a CMOS detector. X-ray camera 46 is typically used for imaging a selected area of wafer 22 at high-spatial resolution, e.g. having a pixel size of 10 μm or smaller, so as to provide higher spatial resolution compared to detector assembly 32.

In some embodiments, system 10 may comprise an integrated optical inspection system 50. Similarly, system may comprise additional integrated sensors, such as photoluminescence (PL) or Raman scattering heads (not shown), configured to provide complementary metrology or inspection capabilities.

In some embodiments, processing unit 38 comprises a processor 34 (described in detail below), which is configured inter alia to process the electrical signal received from detector assembly, and an interface 36 for transferring, to processor 34, the electrical signal received from detector assembly 32.

Typically, processor 34 comprises a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

In some embodiments, processor 34 is configured to analyze the data received from the aforementioned detectors and to determine a diffraction intensity image of the X-ray photons captured by the detectors. Processor 34 is further configured to detect, based on the electrical signal, one or more defects in wafer 22.

Figure 2:
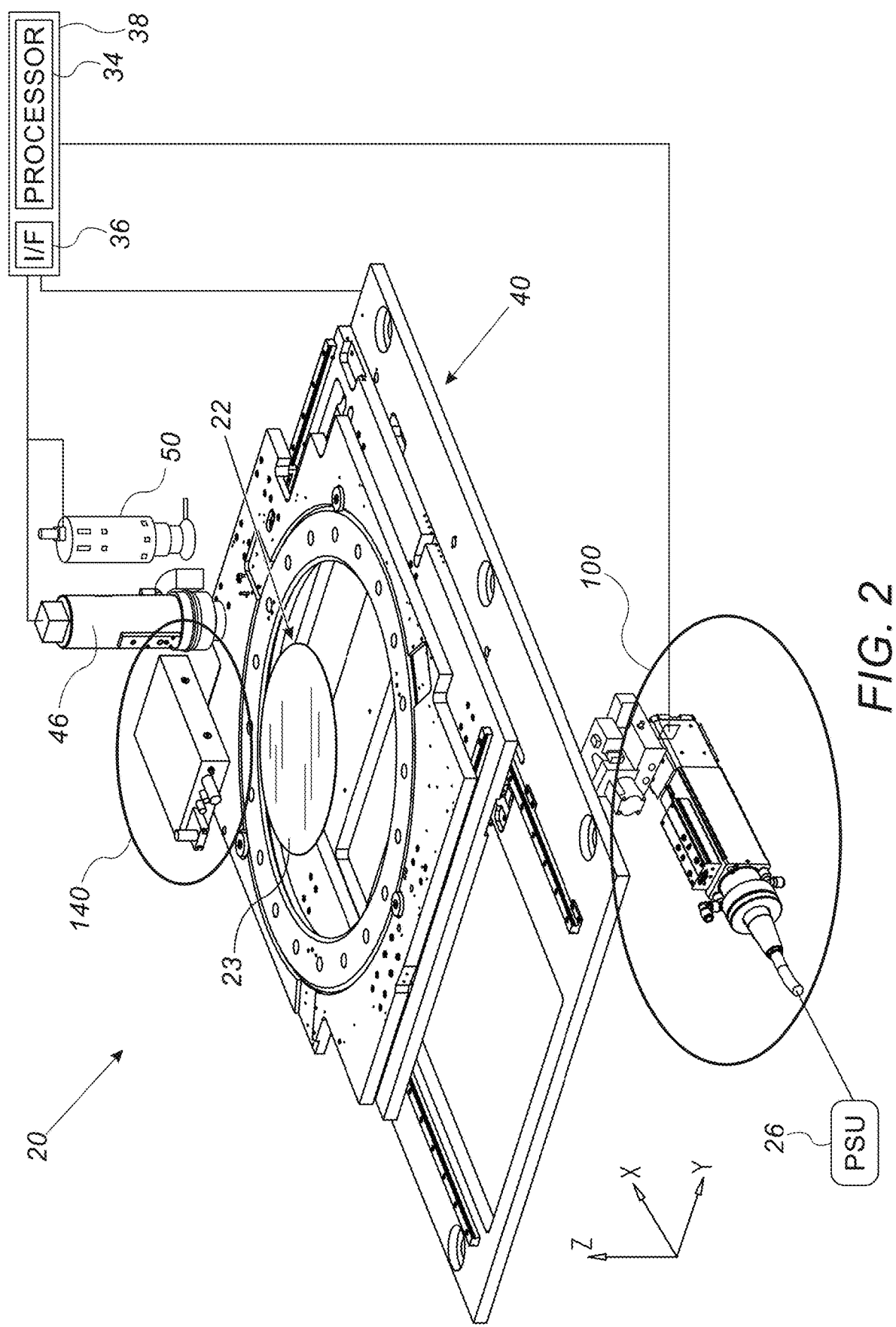
FIG. 2 is a schematic illustration of an X-ray diffraction imaging (XRDI) system, in accordance with another embodiment of the present invention.

FIG. 2 is a schematic illustration of an X-ray diffraction imaging (XRDI) system 20, in accordance with another embodiment of the present invention. In some embodiments, system 20 comprises a source assembly that comprises a single X-ray tube 100, which is similar to at least one of X-ray tubes 25A-25D, and is configured to irradiate samples smaller than wafer 22, e.g., smaller than 100 mm, or a part of a larger sample such as wafer 22. Similarly, system 20 comprises a single detector 140, which is similar to at least one of detectors 33A-33D, and is configured to measure the X-rays diffracted through wafer 22 as described in FIG. 1 above.

In some embodiments, X-ray tube 100 is configured to direct one or more X-ray beams that are divergent when impinging on the lower surface of wafer 22. This functionality was described for source assembly 42 of FIG. 1 above and will be described in more detail in FIG. 3 below.

In some embodiments, all other components and assemblies of system 20 are similar to the corresponding components and assemblies of system 10, and are operating on similar principles to the operation of system 10.

In other embodiments, the configurations of systems 10 and 20 may differ from one another in additional parts, such as having a different source stage. For example, system 10 may have four source sub-stages (also referred to herein as motion sub-assemblies), one sub-stage for each X-ray tube, whereas system 20 may have only one source stage for moving the single X-ray tube of system 20.

The configuration of systems 10 and 20 are simplified for the sake of conceptual clarity and are provided by way of example. In alternative embodiments, the source assembly may be located above upper surface 23, and therefore directs the one or more X-ray beams to upper surface 23. Similarly, the detector assembly may be mounted below the lower surface of wafer 22, so as to detect the diffracted X-ray beam exiting from the lower surface of wafer 22. In another embodiment, the source assembly and detector assembly may be arranged relative to one or two surfaces of wafer 22 using any other suitable configuration.

In some embodiments, systems 10 and 20 may comprise additional components and assemblies, such as a filter and a beam stop, which are described in FIG. 3 below.

Improving Contrast of X-Ray Topography Images

Figure 3:
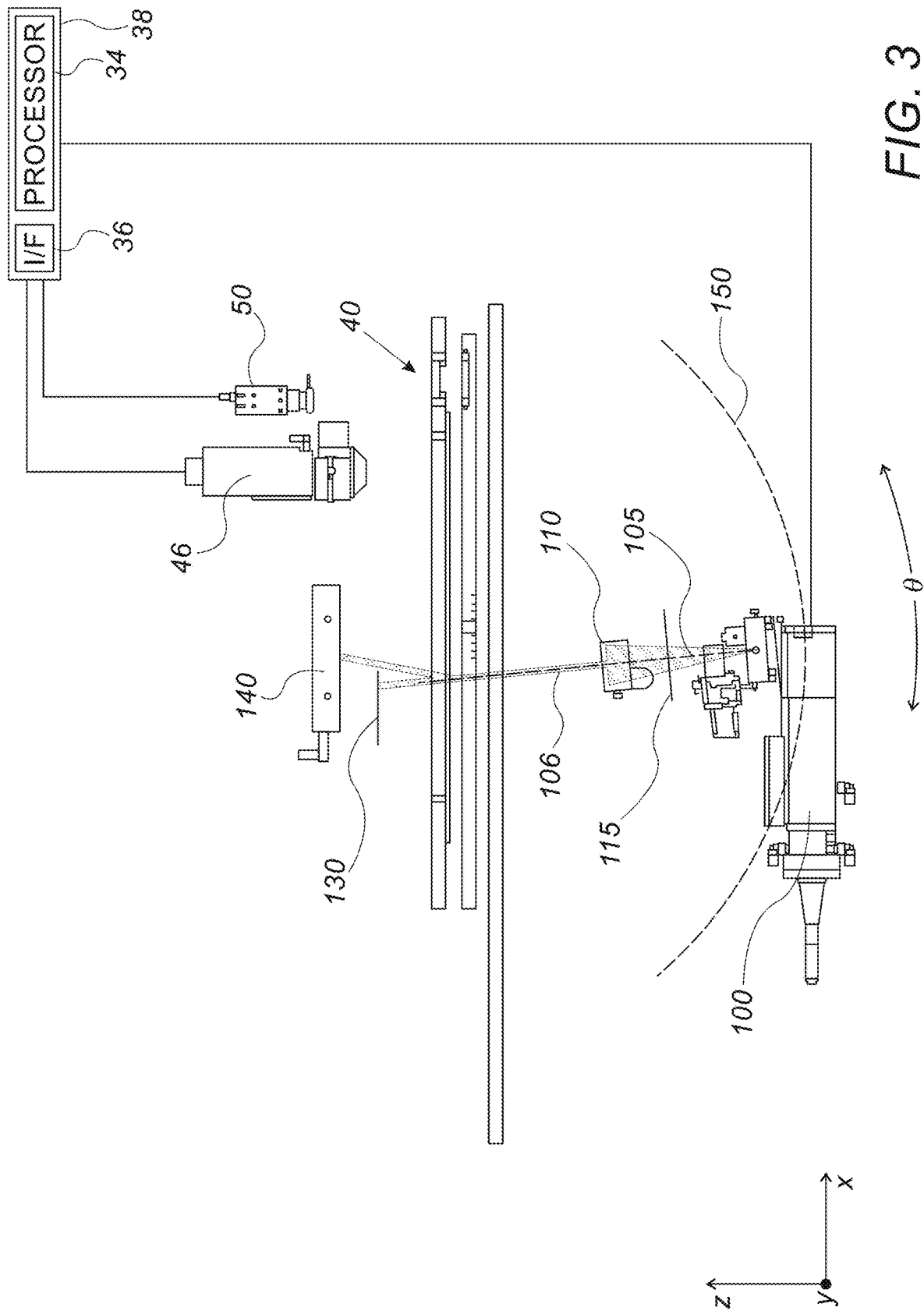
FIG. 3 is a schematic side view of the X-ray diffraction imaging (XRDI) system of FIG. 2, in accordance with an embodiment of the present invention.

FIG. 3 is a schematic side view of an X-ray diffraction imaging (XRDI) system 300, in accordance with an embodiment of the present invention. In some embodiments, system 300 comprises a single X-ray tube 100 and a single detector 140, and therefore, may replace system 20 of FIG. 2 above. In other embodiments, system 300 may comprise any suitable number of X-ray tubes and detectors, and therefore, the embodiments described hereinbelow, are equally applicable to system 10 of FIG. 1, and/or to any other configuration of an XRDI system.

In some embodiments, system 300 comprises a motorized rotation stage 150 that may, for example, be used for rotation stage 42 of FIGS. 1 and 2 above. Rotation stage 150 has a rotation axis along the y-direction and is centered at the surface of wafer 22 (shown in FIGS. 1 and 2 above). In some embodiments, rotation stage 150 is further configured to adjust the angle of X-ray beam 105 relative to the surface of wafer 22, so as to move X-ray beam 105 between different diffraction planes of the crystal. In these embodiment, system 300 is configured to inspect the different diffraction planes of the crystal structure so as to detect and optionally image one or more defects, such as long-range variation of the lattice planes of wafer 22.

In the context of the present disclosure and in the claims, the terms "rotation stage" and "motion assembly" are used interchangeably and refer to a stage moving one or more X-ray tubes of the source assembly. In a source assembly comprising multiple X-ray tubes, or any other apparatus configured to emit one or more X-ray beams or any other suitable type of radiation (e.g., visible light), the motion assembly may comprise a single stage for all X-ray tube, or multiple sub-stages (also referred to herein as motion sub-assemblies) for moving two or more of the X-ray tubes independently of one another.

As described in FIG. 2 above, X-ray tube 100 is configured to direct one or more X-ray beams that are divergent when impinging on the lower surface of wafer 22. The level of divergence is measured by a divergence angle of the beam relative to a major axis of beam 105, which is a straight line between the exit of beam 105 from X-ray tube 100 and the lower surface of wafer 22 (not shown).

In some embodiments, system 300 comprises a motorized slit assembly, referred to herein as a slit 110, which is associated with X-ray tube 100, and is made from a material opaque to at least part (and typically all) of the X-ray spectrum of beam 105. Note that in a system comprising multiple X-ray tubes, such as system 10, each slit is associated with a respective X-ray tube.

In some embodiments, processor 34 is configured to adjust the position and size of slit 110 so as to adapt the divergence angle and spatial extent of X-ray beam 105 to any suitable values.

In some embodiments, system 300 comprises a filter 115, which is mounted between X-ray tube 100 of the source assembly and the lower surface of wafer 22. Filter 115 may comprise one or more layers of materials, also referred to herein as "films," configured to attenuate the intensity of a selected spectral portion of the X-ray beam, which may degrade the quality of the image acquired by detector 140.

For example, a film of niobium (Nb) can reduce the $K\beta$ intensity of Mo, which can otherwise lead to blurring images of dislocation defects in the lattice of wafer 22. Specifically, processor 34 is configured to improve the image quality of wafer 22 by increasing the relative intensity of Mo $K\alpha$ over Mo $K\beta$.

Note that by applying filter 115 to beam 105, the intensities of both Mo $K\alpha$ and Mo $K\beta$, will be attenuated, but the intensity of Mo $K\beta$, is attenuated more strongly compared to the intensity of Mo $K\alpha$. Therefore, the use of filter 115 may increase the signal-to-background ratio in the detection of beam 105 by detector 140, which may improve the contrast (and therefore, reduce the contrast variation) in the imaging of crystalline defects in wafer 22.

Similarly, a film of palladium (Pd) may be used for attenuating the relative intensity of Ag $K\beta$, as compared to the intensity of Ag $K\alpha$, so as to improve the detection and image quality (e.g., contrast) of crystalline defects in wafer 22.

In some embodiments, X-ray tube 100 of the source assembly, filter 115 and slit 110 are all mounted on rotation stage 150. X-ray tube 100 and slit 110 are configured to shape beam 105 to a divergent shape whose divergence angle is typically about 0.1-0.2 degrees, which is substantially larger than the typical range of angles X-ray beams diffracted from wafer 22.

In some embodiments, the aforementioned divergence angle may be sufficient to maintain the diffraction condition for detecting and/or imaging long-range variation of the lattice plane across wafer 22.

In some cases, a significant variation of lattice plane tilt may occur across wafer 22. In some embodiments, rotation stage 150 may also be used for adjusting the incidence angle $\theta$ of beam 105 in the vicinity of the diffraction plane. The adjustment carried out by rotation stage 150 may be used in addition to or instead of the divergence angle of the incident X-ray beam, which is typically sufficient for maintaining the diffraction condition described above.

The inventors have found that such significant long-range lattice tilting may result in high variation in the distribution of the diffracted intensity, also referred to herein as diffraction stripe that appear in the X-ray image acquired, e.g., by detector 140 and processor 34. As described above, the divergence angle of beam 105 improves the distribution of the diffracted intensity even when using a fixed incidence angle $\theta$. However, during the scanning of wafer 22, long term variations in the angle and/or spacing of the crystal lattice planes may cause shift of the diffraction stripe across the surface of detector 140.

In some embodiments, processor 34 is configured to adjust incidence angle $\theta$ by rotation stage 150, so as to set the position of the diffraction stripe to impinge at a constant location on the surface of detector 140. As will be described in detail in FIGS. 5A-5C below, by having the diffraction stripe impinging at a constant location on detector 140, processor 34 is configured to improve the signal-to-background ratio by narrowing the size of a region of interest surrounding the diffraction stripe.

In alternate embodiments, the rotation axis of rotation stage 150 may be above or below the surface of wafer 22. In this embodiment, processor 34 is configured to move rotation stage 150 in a linear translation so as to maintain a constant intercepting position of X-ray beam 105 with the closest surface of wafer 22.

Note that in a system comprising multiple X-ray tubes and detectors such as system 10, each X-ray tube, filter and slit may be mounted on an independent rotation stage. In this configuration, the incidence angle θ of each incident X-ray beam may be adjusted independently by processor 34 or using any other controller of the system. This configuration may be used in case of significant long-range tilting of the lattice planes across the surface of the wafer.

In some embodiments, system 300 comprises a beam-stopper 130 made from an X-ray opaque material, which is mounted between wafer 22 and detector 140. Beam stopper 130 is configured to occlude the directly transmitted beam from irradiating detector 140.

In some embodiments, beam-stopper 130 may be mounted on system 10 so as to occlude the directly transmitted beam from irradiating detector assembly 32. Beam-stopper 130 is further configured to block undesired diffracted beams from irradiating detector 33A as a result of stray radiation from an adjacent X-ray tube, such as tube 25B. This configuration reduces the noise level and artifacts from being detected by the detector assembly.

The particular configurations of systems 10, 20 and 300 depicted above are shown by way of example, in order to illustrate certain problems that are addressed by embodiments of the present invention and to demonstrate the application of these embodiments in enhancing the performance of such an XRDI system. Embodiments of the present invention, however, are by no means limited to these specific sort of example systems, and the principles described herein may similarly be applied to other sorts of X-ray-based systems.

Figures 4A, 4B, 4C:
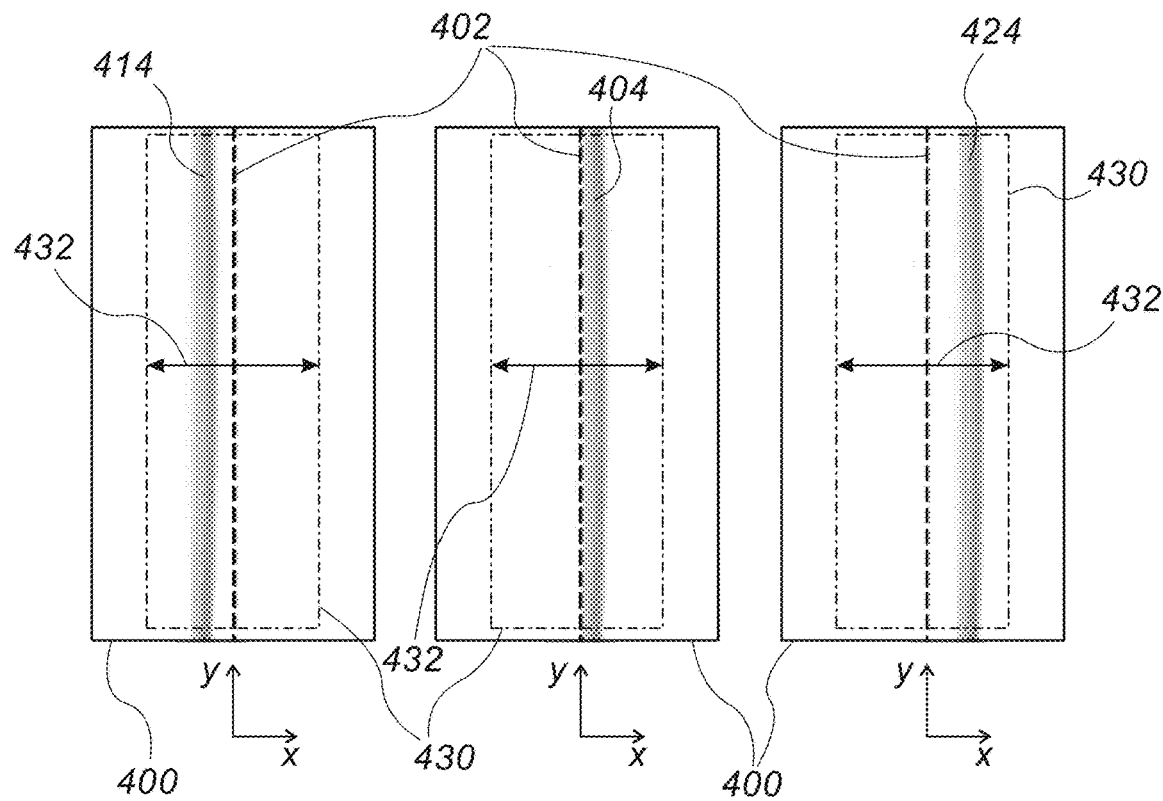
FIGS. 4A, 4B and 4C are schematic illustrations of diffraction stripes obtained on an active area of a detector using a constant incidence angle, in accordance with an embodiment of the present invention.

FIGS. 4A, 4B and 4C are schematic illustrations of diffraction stripes obtained on an active area 400 of detector 140 using a constant incidence angle θ, in accordance with an embodiment of the present invention. In some embodiments, the source assembly of system 300 directs beam 105 emitted from X-ray tube 100 at a given point on the lower surface of wafer 22.

In the examples of FIGS. 4A-4C, the term "given point" refers to a reference point, which may the geometrical center of wafer 22, or any other suitable location on the lower surface of wafer 22. Reference is now made to FIG. 4A. In some embodiments, the source assembly directs beam 105 at the reference point, which is defined as the origin of an XY coordinate system of stage 40.

In some embodiments, beam 105 enters wafer 22 at the lower surface, diffracts while passing through the wafer and exits wafer 22 at an upper surface 23 that is opposite to the lower surface, as described in FIG. 1 above.

In some embodiments, in response to the detected X-ray beam, detector 140 produces an electrical signal, which appears as a diffraction stripe 404 on active area 400 of detector 140. As described in FIG. 3 above, the divergent shape of beam 105 tightens the distribution of beam 105, resulting in a small width (along X-axis) and high contrast of diffraction stripe 404. Note that diffraction stripe 404 is aligned with a center (dashed) line 402 of active area 400.

In some embodiments, wafer 22 is scanned by system 300 along the X-axis, using a constant incidence angle θ. Reference is now made to FIG. 4B. In some embodiments, the source assembly directs beam 105 on wafer 22 in X-direction at −125 mm relative to the reference point and does not change the position of beam 105 in Y-axis relative to the reference point.

In some embodiments, detector 140 produces an electrical signal, which appears as a diffraction stripe 414 on active area 400 of detector 140. Due to long-range variation in the angle and/or spacing of the crystal lattice planes, diffraction stripe 414 shifts relative to center line 402 of active area 400, as shown in FIG. 4B. Note that the diffraction condition of beam 105 is satisfied due to the divergence angle of X-ray beam 105 because different parts of the beam are selected by the crystal. Reference is now made to FIG. 4C. In some embodiments, the source assembly directs beam 105 on wafer 22 in X-direction at 125 mm relative to the reference point (i.e., opposite to the direction described in FIG. 4B above), and does not change the position of beam 105 in Y-axis relative to the reference point.

In response to the interaction with beam 105, detector 140 produces an electrical signal, which appears as a diffraction stripe 424 on active area 400 of detector 140. As described in FIG. 4B above, due to the long-range variation in the angle and/or spacing of the crystal lattice planes, diffraction stripe 424 shifts relative to center line 402 of active area 400.

In some embodiments, processor 34 is configured to reduce undesired background intensity from the image of the diffraction stripe by setting a narrow region of interest (ROI) surrounding the respective diffraction stripe. In these embodiments, processor 34 will use only the portion of X-ray beam 105 diffracted within the ROI to create image of diffraction stripes 404, 414 and 424 in the XRDI-based image of wafer 22.

In some embodiments, processor 34 is configured to set a ROI 430 having a width 432, so as to incorporate the shift of stripe lines 414 and 424 (relative to center line 402) within ROI 430. It will be understood that when moving wafer 22 along Y-axis, the long-range variation in the angle and/or spacing of the crystal lattice planes may cause similar shift of the diffraction stripe also in Y-axis, assuming constant incidence angle θ. Even though the contrast of each individual diffraction stripe is high, processor 34 has to incorporate large background signals from ROI 430 due to the shifts of stripe lines 414 and 424 at constant incidence angle θ.

Figure 4D:
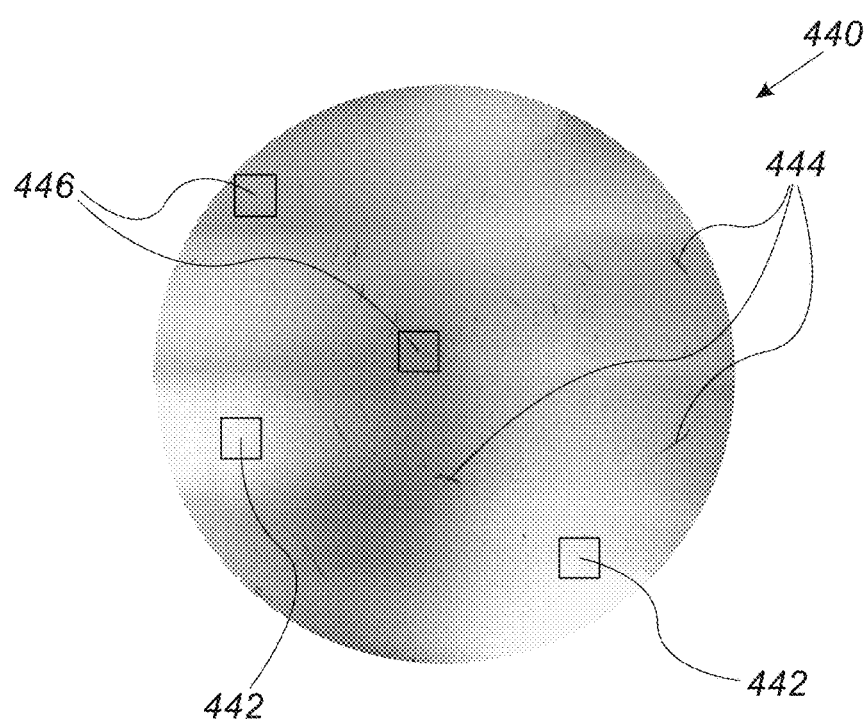
FIG. 4D is a schematic illustration of a defect map of a crystalline wafer, in accordance with an embodiment of the present invention.

FIG. 4D is a schematic illustration of a defect map 440 of wafer 22, in accordance with an embodiment of the present invention. In the context of the present disclosure and in the claims, the terms "defect map" and "wafer map" are used interchangeably and refer to an image of wafer 22 that may have defects, such as crystalline defects, indicated thereon.

In some embodiments, system 300 scans the entire surface of wafer 22 using constant incidence angle θ, and processor 34 produces defect map 440 based on electrical signals received from ROI 430 of detector 140 shown in FIGS. 4A-4C above.

In some embodiments, defect map 440 comprises defects 444, such as crystalline defects, detected by processor 34 and a distribution of gray levels indicative of the intensity of the aforementioned electrical signals produced in ROI 430 by detector 140. For example, defect map 440 comprises bright areas 442 and dark areas 446, indicative of high and low intensities detected, respectively, by detector 140.

As described in FIGS. 4A-4C above, wafer 22 has a significant long-range variation in the lattice planes, therefore, width 432 of ROI 430 must be sufficiently large so as to incorporate the shifted diffraction stripes (e.g., diffraction stripes 414 and 424) within ROI 430. The relatively large size of ROI 430 may cause a significant residual background contribution to the electrical signals received from detector 140, resulting in undesired background signal scattered in the vicinity of the diffraction stripes.

In the example of FIG. 4D, the undesired background signal reduces the signal-to-background ratio and appears, in defect map 440, as bright areas 442 and dark areas 446. Furthermore, the reduced signal-to-background ratio also reduces the detection rate of crystalline defects 444 by processor 34.

In alternative embodiments, processor 34 is configured to define a narrow ROI having a width comparable to that of the respective diffraction stripe. Processor 34 is further configured to adjust the position of the narrow ROI so as to follow the shifted position of the respective diffraction stripe. These embodiments enable narrower ROI, and therefore may increase the signal-to-background ratio. Yet, this method may produce noise, such as digital artifacts that may appear in defect map 440, for example, because of the finite step-size that the position of ROI 430 can be adjusted (e.g., a single pixel).

In other embodiments, the contrast and detection rate described above may be improved by adjusting the incidence angle of X-ray beam 105, as will be described in FIGS. 5A, 5B, 5C and 5D below.

Improving Contrast of X-Ray Topography Images by Adjusting the Incidence Angle

Figures 5A, 5B, 5C:
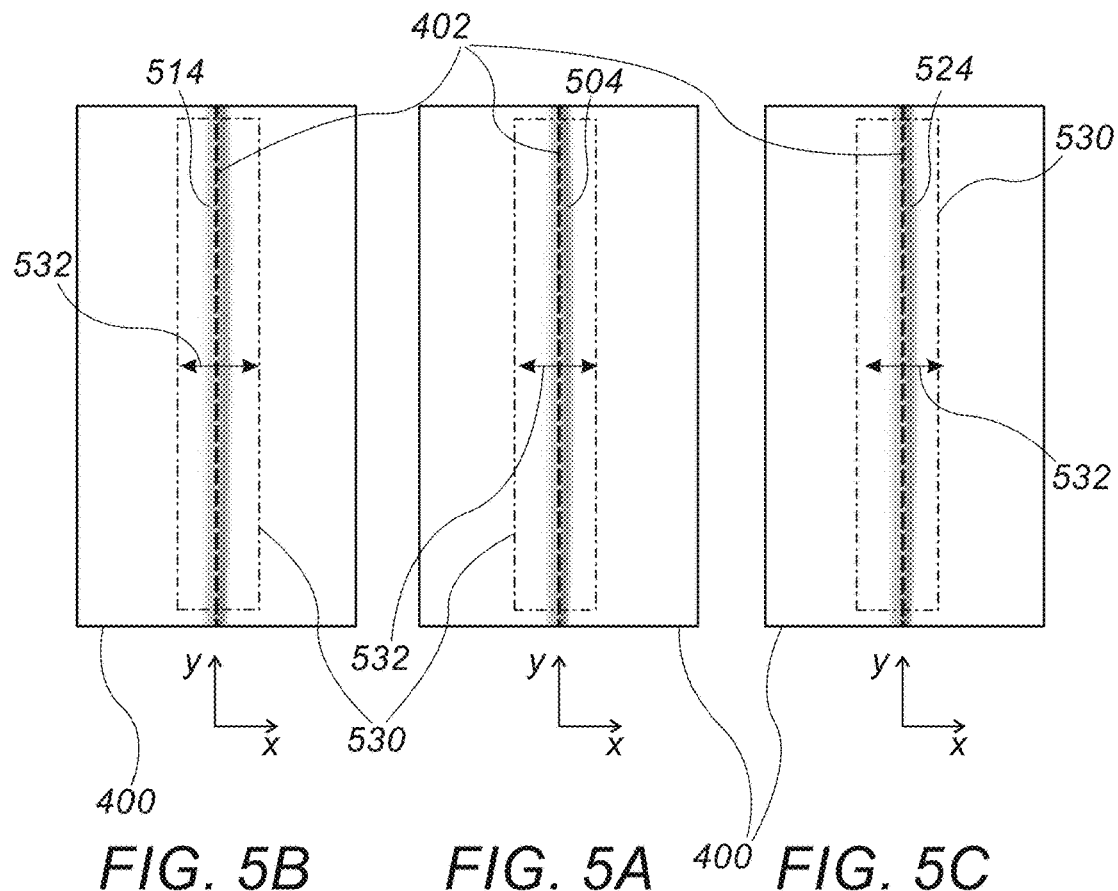
FIGS. 5A, 5B and 5C are schematic illustrations of diffraction stripes obtained on an active area of detector using adjusted incidence angles, in accordance with another embodiment of the present invention.

FIGS. 5A, 5B and 5C are schematic illustrations of diffraction stripes obtained on active area 400 of detector 140 using adjusted incidence angles, in accordance with another embodiment of the present invention. In some embodiments, system 300 scans the entire surface of wafer 22 and processor 34 produces diffraction stripes 504, 514 and 524 at the same respective coordinates in wafer 22, in which processor 34 produced diffraction stripes 404, 414 and 424.

In some embodiments, processor 34 uses rotation stage 150 to adjust incidence angle θ, so as to reposition diffraction stripes 504, 514 and 524 at the same position in active area 400 (e.g., center line 402) of detector 140, as shown in FIGS. 5A, 5B and 5C.

In some embodiments, processor 34 may set a ROI 530 having a width 532, which is significantly smaller than corresponding width 432 of ROI 430. Similarly, the same angle adjustment technique may be used when scanning in Y-axis, so that the length (not shown) of ROI 530 may be reduced compared to the length of ROI 430. In some embodiments, based on the reduced size of ROI 530 (relative to ROI 430), processor 34 is configured to reduce the level of undesired background signal.

In addition, rotation stage 150 is configured to adjust the incidence angle of beam 105 in high resolution. Therefore, processor 34 is configured to adjust the position of diffraction stripes 504, 514 and 524 on active area 400 in a sensitivity higher than the resolution of detector 140, which is define by the pixel size of detector 140. In these embodiments, width 532 matches the width of the detected X-ray beam shown as diffraction stripes 504, 514 and 524. For example, width 532 may have a similar size to the width of each diffraction stripe from among diffraction stripes 504, 514 and 524. Alternatively, width 532 may be larger (e.g., in 10% or in any other selected value) than the maximal width of the broadest diffraction stripe from among diffraction stripes 504, 514 and 524.

Figure 5D:
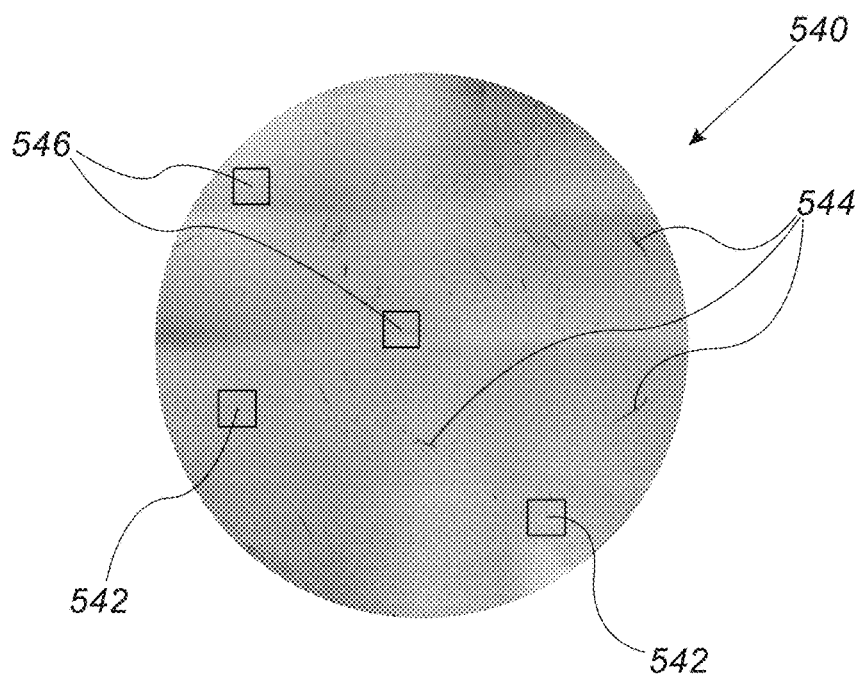
FIG. 5D is an illustration of a defect map of a crystalline wafer, in accordance with another embodiment of the present invention.

FIG. 5D is an illustration of a defect map 540 of wafer 22, in accordance with another embodiment of the present invention. In some embodiments, defect map 540 comprises defects 544, such as crystalline defects 444 of FIG. 4D above and additional crystalline defects detected, due to the improved contrast, by processor 34.

In some embodiments, the distribution of gray levels in defect map 540 is indicative of the intensity of the aforementioned electrical signals produced in ROI 530 by detector 140. Defect map 540 further comprises areas 542 and 546 that correspond, respectively, to areas 442 and 446 of defect map 400.

In some embodiments, by adjusting incidence angle θ during the scanning of wafer 22, processor 34 is configured to reduce the level of background, thereby to reduce the corresponding distribution of gray level in defect map 540, relative to defect map 440.

In some embodiments, by reducing the level of background, processor 34 increases the signal-to-background ratio, thereby improves the detection sensitivity of crystalline defects in any wafer having high amount of long-range variation of the lattice planes, such as in wafer 22.

Although the embodiments described herein mainly address detecting and imaging topography and crystalline defects in semiconductors and compound semiconductor samples, such as wafers and other types of substrates, the methods and systems described herein can also be for detection of defects in other single crystal materials, for example those used in some high-performance optical applications.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system for X-ray topography, the system comprising:
a source assembly, which is configured to direct at least an X-ray beam to impinge, at an angle, on a first surface of a sample, wherein the X-ray beam is divergent when impinging on the first surface;
a detector assembly, which is configured to detect the X-ray beam that had entered the sample at the first surface, diffracted while passing through the sample and exited the sample at a second surface that is opposite to the first surface, and to produce an electrical signal in response to the detected X-ray beam;
a motion assembly, which is configured to move the source assembly relative to the sample; and a processor, which is configured: (i) to control the motion assembly, in response to variations in an angle of diffraction of the X-ray beam from the sample, to compensate for shifts in a position at which the X-ray beam irradiates the detector assembly, so as to increase a signal-to-background ratio (SBR) of the electrical signal produced by the detector assembly, and (ii) to detect one or more defects in the sample based on the electrical signal.

2. The system according to claim 1, wherein the source assembly comprises first and second X-ray tubes, which are mounted respectively on first and second motion sub-assemblies of the motion assembly.

3. The system according to claim 1, wherein the source assembly comprises at least first and second X-ray tubes, mounted on the motion assembly.

4. The system according to claim 1, and comprising a beam stopper, which is configured to attenuate a stray radiation of the X-ray beam.

5. The system according to claim 1, wherein the defects comprise distortions in a crystal lattice of the sample.

6. The system according to claim 1, wherein the processor is configured, based on the electrical signal, to reduce contrast variation across the sample.

7. The system according to claim 1, and comprising a scanning assembly, which is configured to move the sample relative to the source assembly and the detector assembly along one or more directions of scanning.

8. The system according to claim 1, wherein the detector assembly comprises one or more detectors.

9. The system according to claim 1, wherein the processor is configured to detect the one or more defects within a region of interest (ROI) having a width that matches a width of the detected X-ray beam.

10. The system according to claim 1, and comprising a filter, which is mounted between the source assembly and the first surface, and is configured to attenuate an intensity of a selected spectral portion of the X-ray beam.

11. The system according to claim 10, wherein the source assembly comprises at least an X-ray tube, which is configured to emit the X-ray beam, and wherein at least the X-ray tube and the filter are mounted on the motion assembly.

12. The system according to claim 10, wherein the X-ray beam comprises at least kα emission and kβ emission, and wherein the filter is configured to change a ratio between intensities of the kα emission and kβ emission.

13. A method, comprising:
    directing at least an X-ray beam to impinge, at an angle, on a first surface of a sample, wherein the X-ray beam is divergent when impinging on the first surface;
    detecting the X-ray beam that had entered the sample at the first surface, diffracted while passing through the sample and exited the sample at a second surface that is opposite to the first surface, and producing an electrical signal in response to the detected X-ray beam;
    adjusting the X-ray beam, in response to variations in an angle of diffraction of the X-ray beam from the sample, to compensate for shifts in a position at which the X-ray beam is detected, so as to increase a signal-to-background ratio (SBR) of the electrical signal; and
    detecting one or more defects in the sample based on the electrical signal.

14. The method according to claim 13, wherein detecting the defects comprise detecting distortions in a crystal lattice of the sample.

15. The method according to claim 13, and comprising moving the sample along one or more directions of scanning.

16. The method according to claim 13, wherein detecting the one or more defects comprises detecting the one or more defects within a region of interest (ROI) having a width that matches a width of the detected X-ray beam.

17. The method according to claim 13, and comprising attenuating an intensity of a selected spectral portion of the X-ray beam.

18. The method according to claim 17, wherein the X-ray beam comprises at least kα emission and kβ emission, and wherein attenuating the intensity comprises changing a ratio between intensities of the kα emission and kβ emission.

* * * * *

UNITED STATES PATENT AND TRADEMARK OFFICE
CERTIFICATE OF CORRECTION

Page 1 of 1

PATENT NO. : 10,816,487 B2
APPLICATION NO. : 16/266125
DATED : October 27, 2020
INVENTOR(S) : Kevin Monroe Matney et al.

It is certified that error appears in the above-identified patent and that said Letters Patent is hereby corrected as shown below:

On the Title Page

Item (72) The address of inventor Richard Thake Bytheway should read Durham (GB).

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*